BANDWIDTH REDUCTION SYSTEM

Filed Nov. 1, 1957 2 Sheets-Sheet 1

INVENTOR
Hay V. Antranikian
BY
James ...
ATTORNEY

INVENTOR
Haig V. Antranikian
BY
[signature]
ATTORNEY

United States Patent Office 3,059,050
Patented Oct. 16, 1962

3,059,050
BANDWIDTH REDUCTION SYSTEM

Haig V. Antranikian, R.D. 4, Lakewood, N.J.

Filed Nov. 1, 1957, Ser. No. 694,030
7 Claims. (Cl. 178—7.1)

The invention concerns improvements in signalling systems and relates to a signal potential spectrum reducing system without substantial loss of the information contained in the full spectrum whereby it is possible to transmit simultaneously the information contained in a multiplicity of signal potentials, having partly or entirely overlapping spectra, by means of a modulated carrier, the bandwidth of which is substantially reduced. This result is obtained in its simplest form by transferring the information contained in a lower part of a spectrum into an upper part of the same by a process analogous to that used in superheterodynes.

In its broader aspect, the invention contemplates the reduction of bandwidth by transfer of fractional parts of the full spectrum of frequencies containing the television image or other information to a narrower spectrum or bandwidth by superposing the information content of fractions of the original spectrum upon each other and within the narrower bandwidth which may comprise part of the original spectrum, as above indicated, or may in certain cases be entirely outside that spectrum. The invention further contemplates the utilization or availability of substantially the entire signal information content within the narrower spectrum or bandwidth and the transmission thereof and of any other such narrow spectra or bandwidths independently of each other, utilizing independent channels therefor as opposed to the sampling of signals and transmission over a common channel, so that the separation of signals at the receivers may be made by means of simple filters.

The invention is particularly advantageous in "compatible" color television transmission, where the bandwidth for transmitting three colors is the same as that for a monochrome television. In the heretofore proposed systems for transmitting the information contained in overlapping spectra of three color video signals, either a "subcarrier"—such as a "sampling subcarrier"—has been used, which requires a very exacting and difficult phase synchronization at the receiver, or the video signals have been transmitted successively, which may produce flickers and other defects in the received picture. The present invention does away with these difficulties by not using any subcarrier requiring phase synchronization and emitting simultaneously in separate channels the video signals which are to be separated in a receiver.

The present application is a continuation-in-part of my previously filed applications: Serial No. 306,826, filed August 28, 1952, for Signalling Systems; Serial No. 370,378, filed July 27, 1953, for Signalling Systems; and Serial No. 395,885, filed December 3, 1953, for Signalling Systems.

The invention is illustrated by drawings in which.

Figure 1:
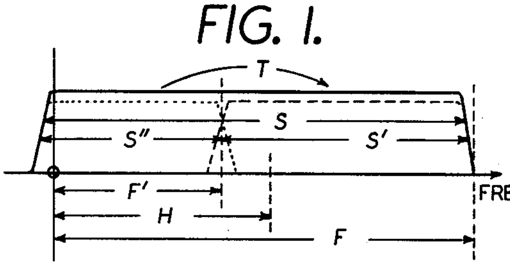
FIGS. 1 and 3 are diagrams for explaining the principle of the invention.

Referring to FIG. 1, the full line represents the spectrum S of a signal potential (which may be, for instance, the video output for one color of a color television camera) extending up to a frequency F, approximately. If a carrier were amplitude modulated by the full frequency content of the spectrum S, the resulting radio frequency signal would have, even if it is limited to a single sideband, a minimum bandwidth equal to F. The invention, in this form, is aimed at reducing this bandwidth to a narrower one, by reducing the spectrum S, without substantial loss of the information comprised in this spectrum, to a fraction S′ (interrupted line, FIG. 1) extending only from a mid-frequency F′ to frequency F; this reduction is made by transferring the information content of the lower fraction S″ of the spectrum S (dotted line, FIG. 1) to the upper fraction S′ of the same.

Figure 3:
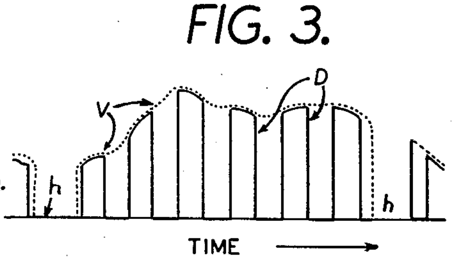
Figures 2, 2A, 5, 5A:
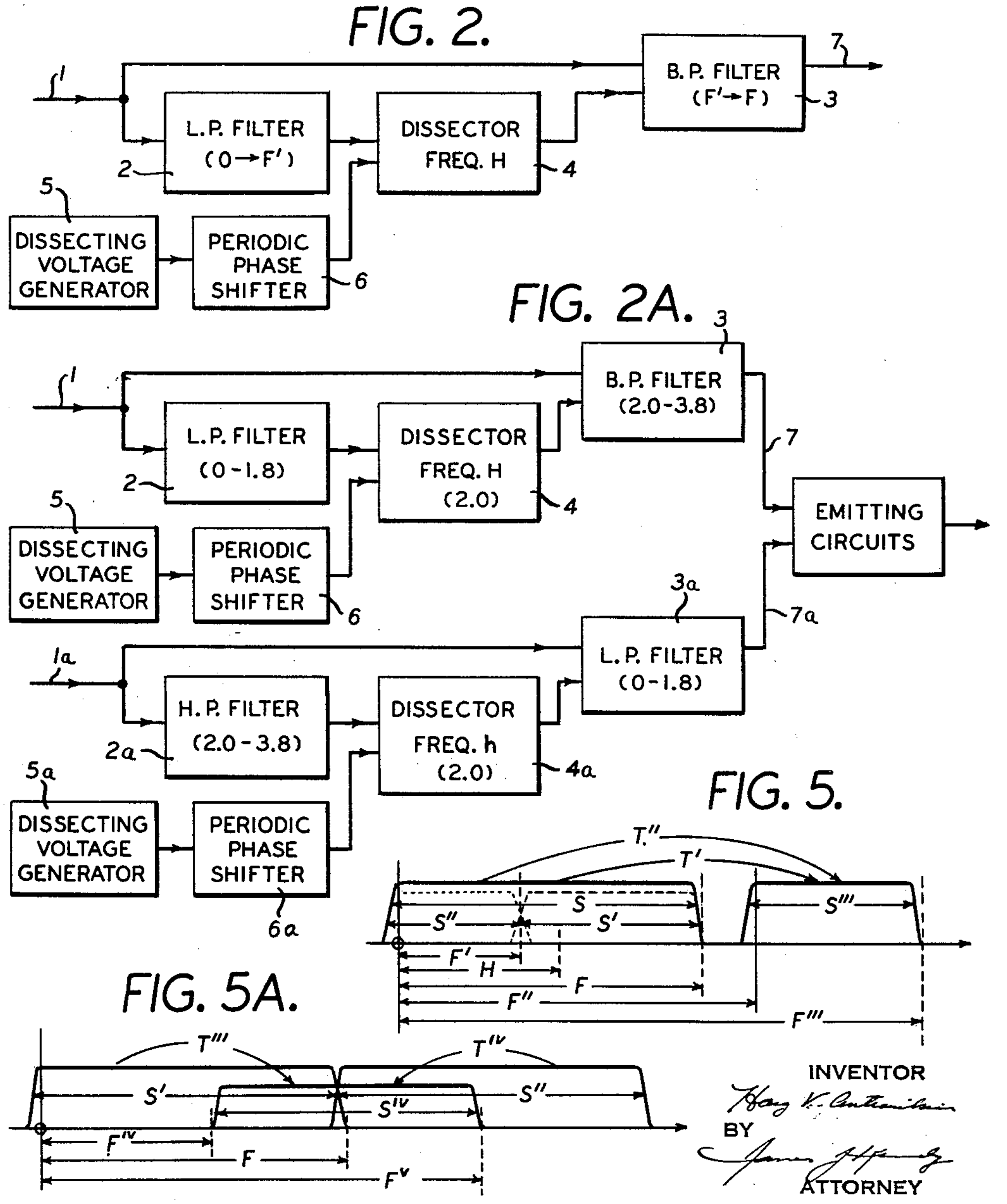
FIG. 2 shows in the form of a block diagram, an apparatus for carrying out the invention in its simplest form.
FIG. 2A shows in the form of a block diagram, an apparatus for carrying out the invention in transmitting two video signals.
FIG. 5 is a diagram, similar to FIG. 1, but showing a modification.
FIG. 5A is a diagram similar to FIG. 5, but showing another modification.

FIG. 2 shows in block diagram form a means for making this transfer. The signal potential at 1, comprising the full spectrum S is divided into two parts respectively connected to two filters 2 and 3; filter 2 is a low pass filter which leaves passage to frequencies up to F′ and thus corresponds to the fraction S″ of the spectrum S, while the filter 3 is a band pass filter which leaves passage to frequencies from F′ to F, thus corresponding to the fraction S′ of the spectrum S. The output of filter 2, represented by the dotted line V in FIG. 3—which may be a video signal and may include periodical zero signals *h* corresponding to horizontal blanking periods—is then dissected at a frequency H; by dissection is meant an operation analogous to modulation, heterodying or chopping, preferably with omission of the part having a sign opposite to that of the video signal; as shown in FIG. 3, the dissection is made by a square wave which converts the signal potential V into a dissected signal D (full line); other forms of dissection will be mentioned later; the dissection may include a periodic shift of phase for reasons which will appear later but this is not an essential requirement. The means for dissecting a signal are well known; as shown in FIG. 2, there is a dissecting voltage generator 5 followed by a phase shifter or inverter 6 (if shifting is desired), the output of which is fed to a dissector 4 together with the output from filter 2; the dissector may simply be a "mixer" or "converter" as used in heterodynes.

The frequency of dissection H, that is, the frequency of voltage in generator 5, is preferably chosen so that the difference $F-H$ is equal or larger than F′; it is also preferably chosen within the spectrum S′ (which means that the spectrum S″ will preferably not exceed one-half of the full spectrum S).

The output from dissector 4, which is the same or is similar to the signal represented by line D in FIG. 3, is connected to the filter 3 jointly with the part of the original signal potential at 1 directly connected to the same filter. The output at 7 of filter 3, although comprising only frequencies within the spectrum S′, contains information corresponding to the full spectrum S, since the output at 7 contains the dissected part of the signal potential corresponding to the lower fraction S″ of the spectrum S (except for a D.C. potential which can be restored later).

The frequency H in generator 5 may be keyed, if desired, by well known means, with any given frequency. This fact may be used to improve the nature of the output at 7. For example, if the input at 1 is a video signal, the output of filter 2 will include blanking periods at a line sweep frequency and its component frequencies will cluster, as is known, around exact multiples of the same line frequency; then the interferences which may occur between the video signal directly connected to the filter 3 and the dissected signal fed to the same filter (both of which include component frequencies within the upper fraction S′ of the spectrum S) may be avoided or greatly reduced by keying the frequency H of dissection in generator 5 with an odd multiple of one-half of the line sweep frequency; this is because then the component frequencies of the dissected signal will cluster around frequencies falling between the multiples of line sweep frequency and will not interfere with the latter. It is not necessary, however, that the frequency H be a very exact odd multiple of one-half the line sweep frequency; a sway by a small fraction of the line frequency will not substantially alter the result.

As will be apparent to those skilled in the art, the method and circuit of the present invention are applicable to a great variety of signals other than video signals of the usual type and representing the output of a television or similar camera. In general, the frequency H may be selected according to the characteristics of the particular signals which are involved, and in such a manner as to avoid undesirable interference effects when the signal fractions are added, and the dissecting frequency H may be keyed to any desired frequency involved in the production of the input signal.

Similarly, the phase of the dissecting voltage H may be controlled or shifted in such manner as to avoid periodic effects producing "moire" or dot pattern in the received picture due to the dissection of the signal. In the case of video signals of the usual type produced by a television camera, the original signals within any given line sweep interval are continuous in character, but the dissection of a signal fraction by a chopping frequency H such as shown in FIG. 3, tends to produce a dissected signal having an interrupted character and tending to produce in any line sweep a pattern of alternate bright and dark spots or dots. By shifting the phase of signal H at an appropriate rate, as by means of the periodic phase shifter 6 of FIG. 2, the chopping voltage during a second frame or field may be shifted by an amount equal to the time interval between pulses of the chopping frequency H, or an odd multiple of this interval, so that any dot pattern produced will, in any two successive images, be displaced so that the bright spots of the second image coincide with the dark spots of the preceding image, thus substantially obliterateing visually any discontinuity introduced by the dissection of the original signal. At the same time, the phase shift of the signal H will average out any periodic addition and subtraction effects which might otherwise occur as between the recombined fractions of the original signal.

Alternatively, in the case of a typical television video signal, as the frequencies tend to bunch about multiples of the line sweep frequency, by keying the frequency H to the line sweep frequency and making the frequency H an odd multiple of one-half of the line sweep frequency, interference effects between the recombined signal fractions may also be substantially eliminated. Other selections of a keyed frequency H may also be utilized to obliterate any discontinuities introduced by the chopping voltage, through causing the bright spots in an image to occupy the dark intervals of a preceding image. Thus, for instance, where a signal is divided in three fractions (as disclosed below), a shift which may give a good result is a cyclical shift of 0, 240, 120 degrees (in that order) in successive fields; the staggered amounts of the shifts may suppress an apparent horizontal "crawl." These shifts produce the desired effect particularly well when the dissecting frequency is an integral multiple of the line scan frequency; however the invention is not limited to that case.

The output of filter 3 at 7 may be utilized in any desired way and in particular for modulating a carrier to form a television signal corresponding to the video input at 1.

Figures 4, 7:
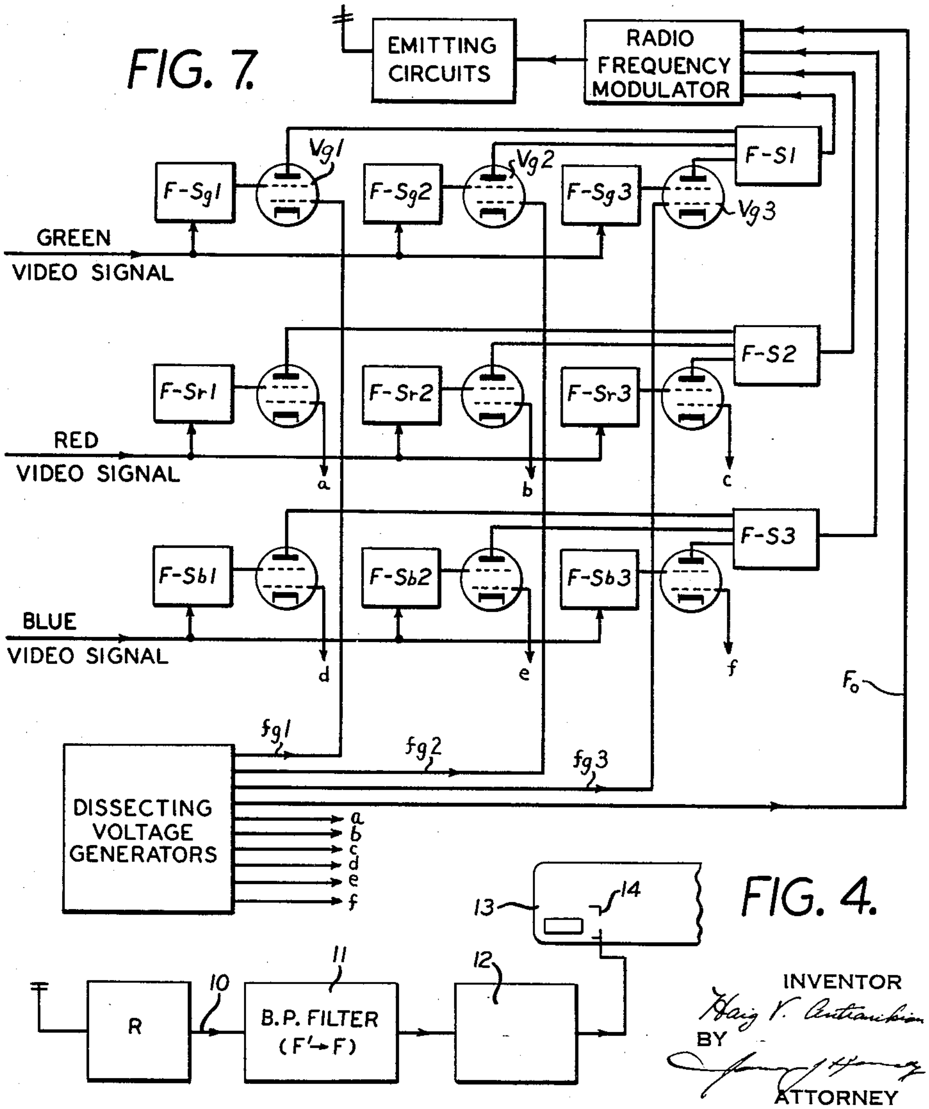
FIG. 4 is a diagram showing in block diagram form a receiving apparatus according to the invention.
FIG. 7 is a block diagram showing an apparatus for carrying out the method of FIG. 6.

FIG. 4 shows in block diagram form a receiver for using such a television signal. The receiver is of the type used in monochrome television, the block R representing the radio frequency, intermediate frequency and demodulating circuits, the demodulated video output being at 10; this output is connected to the band pass filter 11 which leaves passage to the frequencies within the upper fraction S′ of the spectrum S. (This filter is needed only when the demodulated output at 10 contains video signals other than that corresponding to the output at 7 of FIG. 2, such as those described later.) The output of filter 11 is connected to the control grid 14 of a picture tube 13, the particular form of which is immaterial; block 12 represents circuit elements and networks usually found in the connection of a video signal to a picture tube and may include an amplifier, D.C. restorer, peaking or compensating circuits, etc. Since all the information within the whole spectrum S has been collected in the fraction S′ of the same at the transmitter, the output of filter 11 will contain all the information contained in the original video signal at 1 of FIG. 2, except that the information corresponding to the lower fraction S″ of the same video signal will be in a dissected form; the picture reproduced by a beam controlled by the grid 14 will consequently have a resolution comparable to that of a monochrome picture corresponding to the indissected part of the video signal within the spectrum S′, while the part of the picture corresponding to the lower fraction S″ of the spectrum S will probably be reproduced in the form of fine lines (like shadings in a pen drawing) or will have a dot pattern because of the dissected nature of the video in that part of the spectrum; however, if the phase of the dissecting voltage is inverted at every field or frame scanned, as mentioned above, the areas of the picture corresponding to the dissected part of the spectrum, S″, will also appear continuous since the eyes average the pictures of two successive frames scanned.

In a modification, the invention takes advantage from the fact that a dissected signal potential has also a lower sideband which carries substantially the same information as the higher sideband; this fact makes possible the transfer of the information content of a higher fraction of a spectrum, such as S′, into a lower fraction of the same, such as S″ (FIG. 1). This may be done by the same apparatus shown in block diagram form in FIG. 2, the only difference being an interchange of filters, substituting for the low pass filter 2 a high pass filter of suitable value. The full signal potential is connected to the two filters 2 and 3 which let pass, respectively, the frequencies within the fraction S′ of the full spectrum and the fraction S″ of the same. The partial signal potential passing through the high pass filter 2 is dissected at 4 by a dissecting voltage generated at 5 and periodically shifted at 6 in phase, if desired; the frequency of the dissecting voltage is chosen to produce in the lower sideband component frequencies which fall within the fraction S″ of the spectrum, in the instance illustrated it may be equal to H (when S′ and S″ have the same bandwidth) and in general it may be equal to the difference of the mean frequencies of the two fractional spectra. The output of the dissector 4, which includes the lower sideband frequencies, is connected to the filter 3. The output 7 of the filter 3 comprises only component frequencies within the lower fraction S″ of the spectrum but nevertheless contains the information corresponding to both fractional spectrum S′ (through the connection to the dissector 4) and to the fractional spectrum S″ (through the direct connection to the full signal potential at 1).

It is readily seen that the filter 3 functions, for either type of transfer, as an adder as well as a filter, which means that the filtering and adding means may be often the same, within the present invention. If desired, a buffer, such as an amplifier tube (not shown) may be inserted in order to avoid feedback from the output of the dissector 4 to the input 1.

As will be apparent, the method of the invention may be applied to the transmission of any number of color television or other signals. FIG. 2A shows by way of example the application of the method of the invention as applied to the transmission of two video signals, which may be different color signals or may be unrelated signals. It is assumed that each signal has a frequency range or covers a spectrum from zero to 3.8 megacycles. The first signal is applied to the input 1. The frequencies in excess of 1.8 megacycles are rejected in the low pass filter 2, and the remaining signal components in the range from zero to 1.8 megacycles are dissected in the dissector 4 at a frequency H assumed to be 2.0 megacycles, thus shifting this portion of the signal into a range from 2.0 to 3.8 megacycles. The shifted signal is then combined in the band pass filter 3 with the original signal fraction in this range from 2.0 to 3.8 megacycles and passed on to the emitting circuits, as indicated. The second signal also assumed to be in a range from zero to 3.8 megacycles is applied to the input 1*a*, the upper fraction from 2.0 to 3.8 being selected in the high pass filter 2*a* and passed on to the dissector 4*a* operating at a dissecting frequency *h* of 2.0 megacycles and shifting this signal fraction downwardly into the band from zero to 1.8 megacycles, which shifted signal is then applied through the band pass filter 3*a* along with the original signal components in the range from zero to 1.8 megacycles to the emitting circuits, as before. It will be observed that the signals 1 and 1*a* have now been compressed into bands which do not overlap and may thus be transmitted together and separated out at the receiver by simple filter systems without need for accurate phase synchronization.

Figure 6:
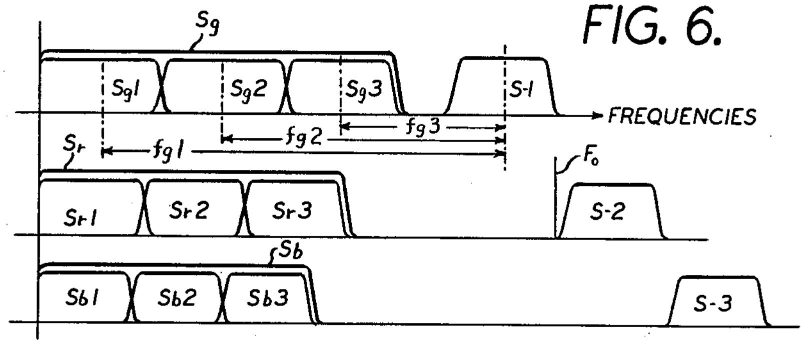
FIG. 6 is a diagram similar to FIG. 1, but showing a still further modification of the invention, as applied to transmission of three color television video signals.

A modified method and apparatus are shown in FIGS. 5, 5A and 6, in which the information content of the higher fraction of the spectrum is also transferred, the information content of both fractions then being within the said lower fraction, partly in both fractions or entirely outside the original spectrum.

FIG. 5 illustrates the method of the invention as applied to a signal such as shown in FIG. 1, but in this case both fractions S′ and S″ are transferred into a higher band S‴ extending from a frequency F″ in excess of the original uppermost frequency F to a still higher frequency F‴. Again, the fractions of the original signal may be transferred into a band of frequencies different from that of either fraction but lying within the range of the original signal. Such a transfer is indicated diagrammatically in FIG. 5A, in which the signal fractions S′ and S″ are transferred into a band $S^{iv}$ extending from a frequency $F^{iv}$ to $F^{v}$ and partly within the original signal fractions S′ and S″. As will be apparent, the signal fractions may vary in number and in width according to the particular purposes to which the method is applied and the ultimate band in which the content of the original signal is then contained may be selected at will and be inside or outside the frequency spectrum of the original signal. In particular, any number of signals having the same or different spectra may be, by the method of the invention, compressed into substantially non-overlapping bands for transmission, and these bands may lie within some one or more of the original frequency spectra of the input signals or be higher or lower than the same. In any event, the signals to be transmitted (corresponding in number to the original video signals) will preferably fill or occupy a predetermined transmission band and without substantial overlap with each other so that they may be separated at a receiver by simply filtering without need for complicated phase synchronization.

FIG. 6 illustrates the transfers of three color video signals in accordance with the invention and FIG. 7 shows, mostly in block diagram form, an apparatus for carrying out the invention in this form.

Referring to FIG. 6, S*g* is the spectrum of a signal potential which may be, for instance, the video signal output for the green color from a color television camera; this videto signal is divided into three parts having component frequencies within corresponding fractional spectral S*g*1, S*g*2, S*g*3, which may have equal bandwidths, as shown, or they may have different bandwidths; in the latter case it is advantageous that the bandwidths be still about equal, that is, not differing from one another by more than, say, 30%. However, in some cases, it may be advantageous to transmit one or more of the dissected fractions of the original signal (such as the fraction S*g*1, containing the lowest component frequencies) with both sidebands, or a part of the second sideband, in which case the original signal is divided so that the bandwidth of this one (or ones) of the fractions is preferably made less than that of the remainder, as, for example, where both sidebands are utilized equally, about one-half the bandwidth of the other fractions.

Similarly, the video signals corresponding to the spectra S*r* and S*b*, which may be, respectively, the red and blue color signals, may be divided into partial video signals corresponding to fractional spectra S*r*1, S*r*2, S*r*3 and S*b*1, S*b*2, S*b*3, respectively.

The three partial video signals corresponding to the fractional spectra S*g*1, S*g*2, S*g*3 are dissected or heterodyned at frequencies *fg*1, *fg*2, *fg*3, respectively, for transferring their component frequencies within the common spectrum or channel S1. It is readily understood that the bandwidth of the channel S1 can be as narrow as the largest of the fractional spectra S*g*1, S*g*2, S*g*3—and this is why it is advantageous to have the latter spectra as nearly equal in bandwidths as possible. It is clear also that, since the frequencies within the channel S1 are all higher than the frequencies within the original spectrum S*g*, the finest resolution of the image represented by the video signal corresponding to the latter spectrum will be conserved when detected in a receiving apparatus.

Similar operations can be performed upon the other video signals. The partial video signals corresponding to the fractional spectra S*r*1, S*r*2, S*r*3, can be dissected or heterodyned and their component frequencies converted into frequencies within the common spectrum or channel S2 which has a much narrower bandwidth than the original spectrum S*r*. The partial video signals corresponding to the fractional spectra S*b*1, S*b*2, S*b*3 can be dissected or heterodyned and their component frequencies converted into frequencies within the spectrum or channel S3. By these operations, the information contents of the three video signals are collected within the respective channels S1, S2, S3; with a proper choice of dissecting or heterodyning frequencies these three channels can be made to be mutually exclusive and, preferably, substantially adjacent; moreover, the total bandwidth of the three channels can be made to not exceed the bandwidth of the spectrum for a single video signal. As already observed, the finest resolutions of the images corresponding to the three video signals are conserved in the transfers of component frequencies into the channels S1, S2, S3. It may be remarked that this conservation of the fine resolutions still holds if one of the channels, say S1, coincides with the highest fraction of the spectrum S*g*3, since the highest frequencies of the video signal corresponding to the spectrum S*g* will still exist in the channel.

The converted signals, that is, the video signals transferred into the channels S1, S2, S3 may be used for modulating a radio frequency carrier voltage; this will produce a radio frequency signal for transmitting the full information contents of the three original video signals in three respective mutually exclusive channels—thus separable in a receiving apparatus by filters—the total bandwidth of which does not substantially exceed that of one of the three original video signals.

An apparatus for carrying out the operations described above, similar to the one described in the aforesaid patent application Serial No. 395,885, is shown in FIG. 7 in block digram form with the exception of a few circuits; for simplicity of explanation it will be assumed as before that the three signal potentials are video signals for the green, red and blue colors from a television camera.

The green video signal is connected to the three filters F–Sg1, F–Sg2, F–Sg3 in parallel; these filter leave passage respectively to frequencies within the fractional spectra Sg1, Sg2, Sg3. The outputs of these filters are connected each to one control grid of the tubes Vg1, Vg2, Vg3; a second control grid of each of the same tubes is connected to one of the voltages at frequencies fg1, fg2, fg3, provided by the "Dissecting Voltage Generators." It will be apparent to persons familiar with the art that the tubes Vg1, Vg2, Vg3, operate as dissectors, if properly biased; therefore the plate outputs of the same tubes will carry at least as one sideband, component frequencies comprised within the channel S1 (FIG. 1), that is as a whole, they will carry the full information content of the video signal for the green color collected within the reduced channel S1. The plate outputs of the three tubes are connected to a filter F–S1 to eliminate the frequencies outside the channel S1 which may exist as a result of the dissecting operations (second sidebands).

The apparatuses connected to the red and blue video signals are exactly similar to that connected to the green video signal just described and operate in the same way; the only differences are in the spectra of frequencies that the filters let pass—which are indicated by the same denotations as the spectra after the letter F—and the dissecting frequencies which are such as to convert the component frequencies within the fractions of the spectra Sr and Sb into component frequencies comprised within the channels S2 and S3, respectively; these dissecting frequencies are also chosen so that the three channels S1, S2, S3 are preferably adjacent but mutually exclusive. The outputs of the filters F–S2 and F–S3 carry, respectively, the full information contents of the video signals for the red and blue colors.

The outputs of the three filters F–S1, F–S2, F–S3 are connected to a "radio frequency modulator," preferably a single sideband modulator, for modulating with these outputs a carrier radio frequency voltage. It is obvious that the output of the modulator will contain in adjacent mutually exclusive radio frequency channels the full information contents corresponding to the full spectra Sg, Sr and Sb of the video signals for the three colors. The modulation may be amplitude or frequency modulation of any form. Whatever the mode of modulation, the total bandwidth obtained by the present invention is considerably narrower than the bandwidth which would be obtained by other known means. The modulated signals may be emitted in any known way.

The above described method and apparatus may be used advantageously for long distance relaying of color television video signals; but they may also be used for transmitting, for instance, two signals for two black and white pictures, with room for sound signals, in the same radio frequency bandwidth as that for a single picture when other known means are used. It must be understood that, though the above description has been made with reference to three signal potentials, the same method and means can be applied when two or more than three signal potentials are to be transmitted and that, accordingly, the division of the signal potentials and the fractioning of the corresponding spectra can be made also in any number other than three. As far as the applicant is aware, the method is new even when applied for reducing the bandwidth of transmission of a single signal potential.

It must be understood also that frequencies of dissection of the partial signal potentials can be such that the spectra S1, S2, S3 theselves correspond to radio frequency channels and thus the signals transferred to that spectra can be emitted directly without further modulation.

A method equivalent to the one described above consists in choosing dissecting frequencies such that two or more of the channels S1, S2, etc., overlap partly or entirely and then modulating separate carrier frequencies which produce adjacent and mutually exclusive radio frequency channels of reduced bandwidth.

The spectra S1, S2, S3 in FIG. 6 may all be within the intermediate frequency (IF) band of a receiver, so that the IF signal in these receivers may be obtained by simple demodulation or detection of the radio frequency signal received. For example, the spectra S1, S2 and S3 may occupy bands of frequencies each about 1.3 megacycles in width and all falling within a normal receiver IF bandwidth of about 4 megacycles available for video signals.

When the freqeuncies within the spectra S1, S2, S3 are greater than the maximum video scanning frequencies, as in the case just mentioned, and transmitted through a radio frequency carrier, a demodulation can be made by known methods in a receiver for reproducing signals corresponding to the spectra S1, S2, S3 as formed at the transmitter and described above. It is readily understood that these signals can be applied directly to the intensity-of-light controlling grids (or cathodes, as the case may be) of a color picture reproducing tube, for instance. This type of transmission and control of the picture has a great advantage over the conventional methods, due to the signals S1, etc. occupying higher frequency bands, because of either or both of the following facts: In the first place, the dots of the dot pattern mentioned above, due to dissection of fractional signals, will be smaller than when the spectra in question are within the original video signal spectra such as Sg, Sr, etc., since the frequencies of dissection producing the spectra S1, etc. are higher than those of the video signal spectra, and the dots may be small enough not to the noticeable; in the second place, these smaller dots may be even smaller than the spot of the picture tube scanning beam, so that the successive dots produced by the signals will fuse into one another, thus making the dot structure disappear altogether. Consequently, for either or both reasons, every frame scanned will reproduce the transmitted image without apparent dot structure and this shows the great advantage of the method described in connection with FIG. 6 over the known method of transmission of signals in which the scanning of two successive frames is necessary for deleting the apparent dot structure in the image.

It is also possible, with the method and apparatus of the invention, to transmit between two or more of the signals S1, S2 and S3, or at their edges, one or more auxiliary pure sinusoidal signals, such as the signal $F_0$, as indicated in FIGS. 6 and 7, in the event that such signal is desired for demodulation or other purposes.

What is claimed is:

1. Apparatus for transmitting a plurality of video signals representing the scanning of a picture which comprises means for dividing each such signal into a set of sub-signals, each such sub-signal occupying a fraction of the frequency spectrum of the respective original signal and the frequency spectra occupied by the said sub-signals substantially filling the frequency spectrum of the said respective original signal, means for generating a dissecting voltage and for thereby dissecting sub-signals of each set and thus transferring them into predetermined bands having a fraction of the bandwidth of the original signals, whereby all sub-signals corresponding to a given original signal are transferred into the same one of the said predetermined bands to form a derived signal having a frequency spectrum which has a fraction of the bandwidth of that of the original signal, the said predetermined bands having substantially no overlap, and means for transmitting the thus derived signals through transmission channels lying in frequency bands having substantially no overlap, whereby the said derived signals may be separated at a receiver by simple filter networks.

2. Apparatus according to claim 1, comprising also means for shifting the phase of the said dissecting voltage whereby the crests of the said voltage during a succeeding scanning of the picture are in phase with the troughs of the said voltage during a previous scanning, whereby discontinuity due to the dissecting voltage is substantially eliminated in the image produced.

3. Apparatus according to claim 2, in which the picture is scanned by lines and comprising also means keying the dissecting voltage to the line sweep frequency and maintaining it at a frequency which is an odd multiple of one-half of the line sweep frequency.

4. Apparatus according to claim 1, in which the lower sideband of one of the said dissected sub-signals is utilized and the said sub-signal is transferred to a said predetermined band whose upper frequency limit is lower than the lower frequency limit of the said sub-signal.

5. Apparatus according to claim 1, in which the said predetermined bands have lower frequency limits which are higher than the upper frequency limits of the said original signals.

6. Apparatus according to claim 5, comprising also means for transmitting the said derived signals directly whereby the emitting frequencies correspond to the frequencies within the said predetermined bands.

7. Apparatus according to claim 1, in which the upper frequency limit of one of said transmission channels is spaced below the lower frequency limit of an adjacent such channel and comprising means for transmitting a said signal in the space between the said transmission channels.

References Cited in the file of this patent

UNITED STATES PATENTS 2,635,140 Dome ------------------ Apr. 14, 1953